United States Patent [19]
Leonard

[11] 3,863,377
[45] Feb. 4, 1975

[54] FISHING GAFF

[76] Inventor: Clifford R. Leonard, 27 Church St., East Providence, R.I. 02914

[22] Filed: Sept. 17, 1973

[21] Appl. No.: 398,238

[52] U.S. Cl............................ 43/6, 119/151, 294/26, 294/110 A
[51] Int. Cl............................................. A01k 81/00
[58] Field of Search............ 43/6, 5; 294/26, 110 A; 119/152, 151

[56] References Cited
UNITED STATES PATENTS

| | | | |
|---|---|---|---|
| 2,507,411 | 5/1950 | Killian | 119/152 |
| 3,311,398 | 3/1967 | Erhardt | 294/26 X |
| 3,405,472 | 11/1968 | Guidry | 43/6 |
| 3,456,376 | 7/1967 | Chappell | 43/6 |
| 3,540,769 | 11/1970 | Rosser | 43/6 X |

Primary Examiner—Robert Peshock
Assistant Examiner—J. Q. Lever
Attorney, Agent, or Firm—Salter & Michaelson

[57] ABSTRACT

A fishing gaff having a hollow handle from which a gaff rod projects, the gaff rod having a hook portion formed on the outer end thereof and being biased outwardly to a cocked position and being retained in the cocked position by a trigger mounted on the handle, the trigger being depressed for releasing the gaff rod from the outer cocked position, wherein the gaff rod is urged inwardly in a rapid retracting movement for penetrating the body of a fish when the fish is to be boated after the landing thereof.

8 Claims, 4 Drawing Figures

PATENTED FEB 4 1975   3,863,377
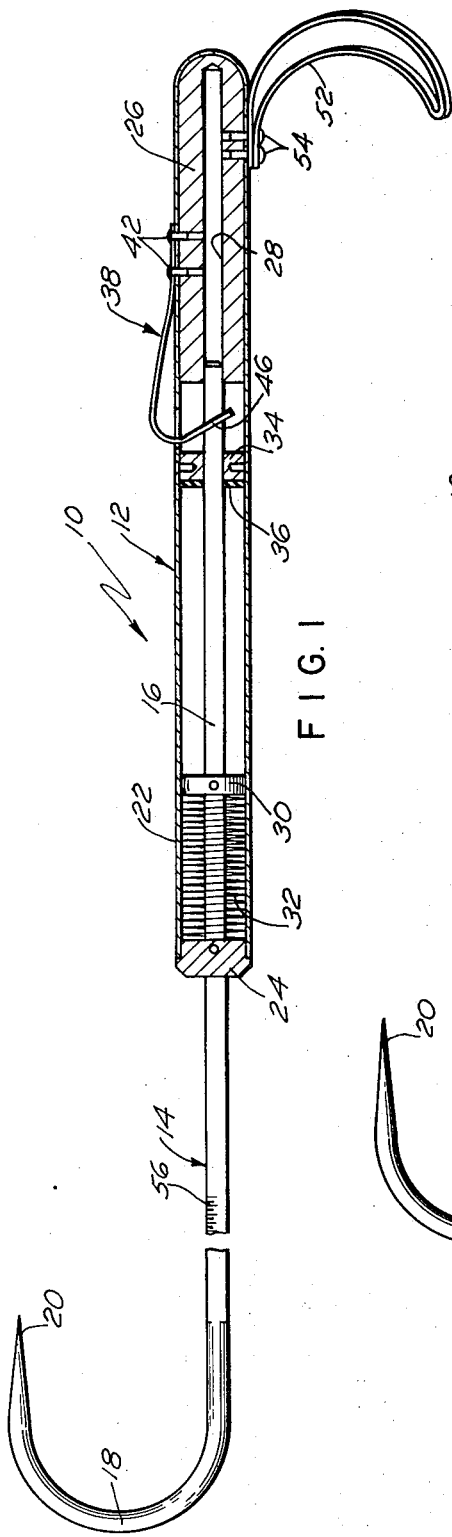
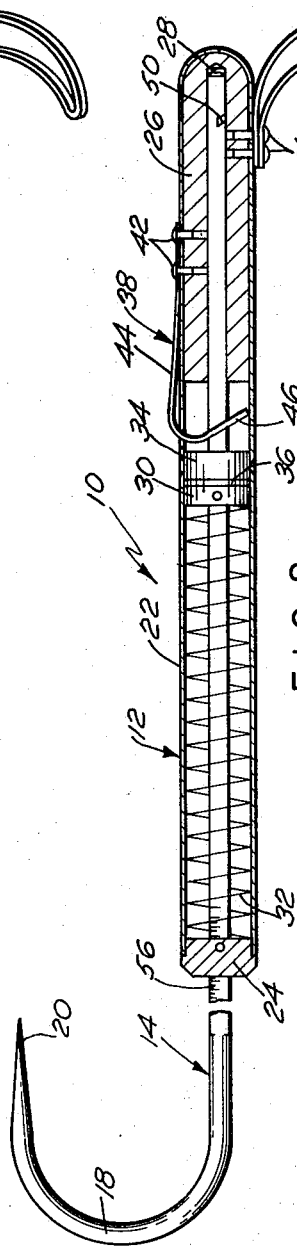
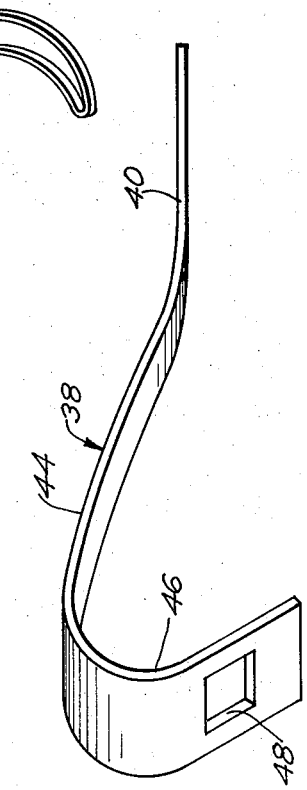
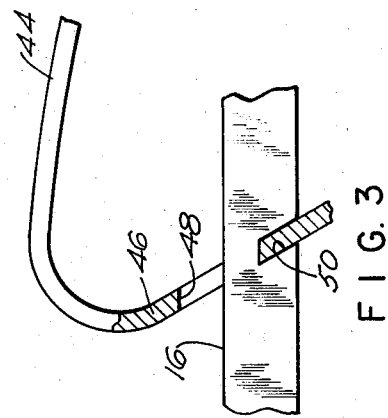

FISHING GAFF

BACKGROUND OF THE INVENTION

A fishing gaff is commonly used in the boating of a fish after the landing thereof, and normally has taken the form of a fixed rod on the outer end of which a hook was formed. Such a fishing gaff has been commonly used by most fishermen and always depended upon the skill of the fisherman in drawing the hook into the body of the fish for successfully using the gaff in the boating of the fish. Several variations in fishing gaffs have been developed heretofore, wherein the gaff rod was axially movable, but this kind of device provided for moving of the gaff rod inwardly to an inactive position for shielding the pointed end of the hook portion of the gaff. When the gaff was to be used, the hook portion was moved outwardly, usually by a spring, to the extended position thereof. Although these prior known gaffs were acceptable for use, the manner of use thereof remained the same as before; and the successful employment of such prior known gaffs still depended upon the skill of the fisherman and the manner in which he employed the gaff for the boating of the fish. Further, many of these prior known fishing gaffs that incorporated retracting mechanisms were complicated in structure which necessarily increased the cost thereof.

SUMMARY OF THE INVENTION

The fishing gaff embodied in the present invention differs basically from prior known gaffs in that the gaff rod is moved inwardly in a rapid retracting action by a spring for penetrating the body of the fish for the boating thereof. For this purpose, the fishing gaff of the subject invention includes a hollow handle into which a gaff rod having an elongated shaft portion extends for axial movement therein. A hook portion is joined to the shaft portion of the gaff rod and is located in spaced relation relative to the handle. The hook portion is moved outwardly to a cocked position by biasing the gaff rod against the action of a spring located in the handle, a trigger being mounted on the handle and being engageable with the gaff rod for retaining the hook portion of the gaff in the outer cocked position thereof. After a fish has been landed and is to be boated, the hook portion is placed under the body of the fish; and upon depression of the trigger, the hook portion is rapidly urged inwardly to penetrate the body of the fish, whereafter the fish may be boated in the usual manner.

Accordingly, it is an object of the present invention to provide a fishing gaff having a gaff rod on which a hook portion is formed that is axially movable inwardly for penetrating the body of the fish for the boating thereof.

Another object of the invention is to provide a fishing gaff having a hollow handle and a gaff rod extending into the hollow handle for axial movement therein, a hook portion being joined to the gaff rod and being axially movable therewith relative to the hollow handle by a spring located in the handle when the gaff is used to boat a fish.

Still another object is to provide a fishing gaff having a hollow handle into which a gaff rod extends, the gaff rod being moved outwardly to a cocked position against the action of a spring located in the handle and being released by a trigger for a rapid retracting movement, wherein the hook portion of the gaff rod is caused to penetrate the body of the fish after the fish has been landed and is to be boated.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a sectional view of the fishing gaff embodied in the present invention showing the gaff rod located in the outer cocked position thereof;

FIG. 2 is a sectional view similar to FIG. 1 showing the gaff rod in the inner retracted position;

FIG. 3 is an enlarged fragmentary partial sectional view of a portion of the gaff rod and the trigger mounted on the handle, a notch being shown as formed in the rod that cooperates with an opening formed in the trigger for retaining the gaff rod in the cocked position thereof, and FIG. 4 is a perspective view of the gaff rod trigger.

DESCRIPTION OF THE INVENTION

Referring now to the drawing and particularly to FIG. 1, the fishing gaff embodied in the present invention is illustrated and is generally indicated at 10. It is understood that the fishing gaff 10 is employed in the usual manner by a fisherman and is designed to aid the fisherman in boating a fish after it has been landed.

The fishing gaff 10 includes a handle generally indicated at 12 and a gaff rod generally indicated at 14, the gaff rod including a shaft portion 16 that extends inwardly of the handle 12 and a hook portion 18 having a pointed end 20 of conventional construction.

The handle 12 comprises a hollow body portion 22 that is closed at the forward end thereof by an end plug 24 and that has an interior element 26 fixed therein adjacent to the rear end thereof. A bore 28 is formed in the element 26 for receiving the innermost end of the shaft portion 16 of the gaff rod 14. Fixed to the shaft portion 16 of the gaff rod 14 is a disc 30, a coil spring 32 being located in encircling relation around the shaft portion 16 and between the end plug 24 and disc 30.

Also located within the interior of the body portion 22 of the handle 12 in fixed position is a stop 34 having a rubberized cushion 36 fixed thereto, the stop 34 and cushion 36 having suitable openings formed therein through which the shaft portion 16 extends. It is seen that the shaft portion 16 of the gaff rod 14 is moved axially of the handle 12; and when the gaff rod 14 is moved to the outer or cocked position thereof, the spring 32 is compressed between the disc 30 and the end plug 24, as also illustrated in FIG. 1.

In order to retain the gaff rod 14 in the outer or cocked position thereof, a trigger generally indicated at 38 is provided; and, as illustrated in FIGS. 1 and 2, the trigger 38 is secured to the handle 12. As shown in FIGS. 3 and 4, the trigger 38 includes a relatively flat rear portion 40 through which rivets 42 are directed for securement of the trigger 38 to the body portion 22 of the handle 12 and the interior element 26. The trigger further includes an inclined central portion 44 to which a reversely directed forward portion 46 is joined. Formed in the reversely directed forward portion 46 is an opening 48 that is substantially square in configuration and that is dimensioned for receiving the shaft portion 16 in slidable relation therein. As illustrated in FIG. 3, a notch 50 is formed in the underside of the shaft portion 16 of the gaff rod 14, the notch 50 being dimensioned for receiving an edge of the opening 48 therein for locking the gaff rod 14 in engagement with the trigger 38, when the gaff rod is moved to the outer cocked position thereof.

In use of the fishing gaff 10, the gaff rod 14 is normally retained in the inactive position as shown in FIG. 2, wherein the spring 32 is deenergized and the disc 30 is located in engagement with the inner stop 34. In this position the inner end of the shaft portion 16 is located inwardly of the bore 28 at substantially the endmost portion thereof. After the fisherman has landed a fish and in preparation for boating the fish, he moves the gaff rod 14 outwardly of the handle 12 to the cocked position, preferably by placing his foot on the hook portion 18 and pulling the handle 12 rearwardly. This compresses the spring 32 and the notch 50 of the shaft 16 of the gaff rod moves into the locked position thereof in engagement with the opening 48 in the trigger 38, as illustrated in FIG. 3. The gaff rod 14 is now located in the outer cocked position thereof as shown in FIG. 1. After the fish has been landed and is to be boated, the fisherman locates the hook 18 and the pointed end thereof beneath the fish and depresses the trigger 38. As the trigger 38 is depressed, the forward portion 46 moves downwardly to align the opening 48 with the shaft portion 16, thereby releasing the shaft portion 16 from the locked position thereof. The spring 32 then rapidly retracts the gaff rod 14 moving it to the position as shown in FIG. 2, the stop 34 restricting further movement of the disc 30 as it is urged inwardly by the spring. As the pointed end 20 of the hook portion 18 rapidly moves rearwardly, it penetrates the body of the fish, and the fisherman then boats the fish in the usual manner.

A thong 52 may be secured to the handle 12 by rivets 54 in the usual manner and aids the fisherman in handling the fishing gaff. If desired, numerical markings 56 may be applied to the shaft portion 16 of the gaff rod 14 for use as a weight measuring means for estimating the weight of the fish after it has been boated. In this connection the markings may be provided with numerical values and read with respect to the outer end of the plug 24 to arrive at an estimated weight of the fish as the fish is suspended from the hook portion 18 and the handle portion 22 is held in substantially a vertical upright position.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fishing gaff, comprising a hollow handle, a gaff rod having an elongated shaft portion extending into said hollow handle for axial movement the rein and a hook portion joined to said shaft portion and located in spaced relation relative to said handle, said gaff rod being axially movable relative to said handle from an inner inactive position to an outer cocked position, wherein said hook portion is moved outwardly relative to said handle, spring means located in said handle and responsive to outer movement of the gaff rod for biasing the gaff rod in the outer cocked position, and a trigger mounted on said handle and engaging the shaft portion of said gaff rod for releasing the gaff rod from the cocked position, wherein said gaff rod is rapidly urged inwardly in a retracting movement by said spring means for penetrating the body of a fish when the fish is to be boated after the landing thereof, said trigger having an inwardly extending forward portion in which an opening is formed, the shaft portion of said gaff rod extending through said opening and being restrained therein when the gaff rod is biased to the outer cocked position thereof.

2. A fishing gaff as claimed in claim 1, said shaft portion of said gaff rod having a relatively square cross-sectional configuration, and the opening in the forward portion of said trigger having a similar configuration for accommodating the shaft portion of said gaff rod therein.

3. A fishing gaff as claimed in claim 2, said shaft portion having a notch formed therein that is engageable in the opening in the inwardly extending forward portion of said trigger for maintaining the gaff rod in the outer cocked position thereof.

4. A fishing gaff, comprising a hollow handle, a gaff rod having an elongated shaft portion extending into said hollow handle for axial movement therein and a hook portion joined to said shaft portion and located in spaced relation relative to said handle, said gaff rod being axially movable relative to said handle from an inner inactive position to an outer cocked position, wherein said hook portion is moved outwardly relative to said handle, spring means located in said handle and responsive to outer movement of the gaff rod for biasing the gaff rod in the outer cocked position, and a trigger mounted on said handle and releasably engaging the shaft portion of said gaff rod for retaining the gaff rod in the outer cocked position, said trigger being actuated for releasing the shaft portion of said gaff rod from the outer cocked position, wherein said gaff rod is rapidly urged inwardly in a relatively linear retracting movement by said spring means for penetrating the body of a fish when the fish is to be boated after the landing thereof.

5. A fishing gaff as claimed in claim 4, said spring means including a coil spring located in said handle in surrounding relation relative to the shaft portion of said gaff rod and forwardly with respect to said trigger.

6. A fishing gaff as claimed in claim 5, one end of said spring being interconnected to said gaff rod and movable therewith, wherein said spring is compressed when the gaff rod is moved to the outer cocked position thereof.

7. A fishing gaff as claimed in claim 4, said trigger including a rear portion that is secured to an outer surface of said handle, and a forward portion joined to said rear portion and being bent relative thereto for projecting into the interior of said handle for engagement with the gaff rod.

8. A fishing gaff as claimed in claim 4, said trigger being formed of a spring material that enables said forward portion to be normally located such that it is engageable with said gaff rod when the gaff rod is moved to the outer cocked position thereof for restraining the gaff rod in the outer cocked position, whereafter depression of said trigger releases said gaff rod for the retracting movement thereof.

* * * * *